United States Patent
Saito et al.

(10) Patent No.: US 8,463,712 B2
(45) Date of Patent: Jun. 11, 2013

(54) TRACEABILITY VERIFICATION SYSTEM, METHOD AND PROGRAM FOR THE SAME

(75) Inventors: Mika Saito, Yamato (JP); Yuji Watanabe, Yokohama (JP); Madoka Yuriyama, Fujisawa (JP); Takeo Yoshizawa, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 12/536,483

(22) Filed: Aug. 5, 2009

(65) Prior Publication Data
US 2010/0010933 A1    Jan. 14, 2010

Related U.S. Application Data

(62) Division of application No. 11/428,316, filed on Jun. 30, 2006, now Pat. No. 8,055,589.

(30) Foreign Application Priority Data

Jul. 1, 2005  (JP) .................................. 2005-193236

(51) Int. Cl.
  *G06Q 20/00*  (2012.01)
  *G06Q 30/00*  (2012.01)
(52) U.S. Cl.
  USPC .............................................. 705/76; 705/27
(58) Field of Classification Search
  USPC ........................................... 705/1–45, 50–79
  See application file for complete search history.

(56) References Cited

U.S. PATENT DOCUMENTS

| | | | |
|---|---|---|---|
| 4,868,877 A * | 9/1989 | Fischer | 713/157 |
| 5,787,172 A * | 7/1998 | Arnold | 713/175 |
| 6,253,322 B1 * | 6/2001 | Susaki et al. | 713/170 |
| 7,366,684 B1 * | 4/2008 | Douglas | 705/26 |
| 7,610,614 B1 * | 10/2009 | Frankel et al. | 726/4 |
| 2003/0051144 A1 * | 3/2003 | Williams | 713/178 |
| 2005/0288938 A1 * | 12/2005 | Date et al. | 705/1 |
| 2007/0106892 A1 * | 5/2007 | Engberg | 713/168 |
| 2008/0046310 A1 * | 2/2008 | Canard et al. | 705/12 |

* cited by examiner

*Primary Examiner* — Alexander Kalinowski
*Assistant Examiner* — Murali Dega
(74) *Attorney, Agent, or Firm* — Ido Tuchman; William J. Stock

(57) ABSTRACT

A system for enabling verification in traceability of a supply chain while maintaining confidentiality of private suppliers. A group signature is applied to an undisclosed supplier. The undisclosed supplier previously receives registration to the certificate authority device, and performs a group signature based on the certificate issued by the certificate authority device. A disclosed supplier and the undisclosed supplier sign and generate a signature chain when they ship parts. A verifier device receives a signature chain with products shipped from the supplier manager device, divides a signature of the disclosed supplier from a signature chain, and verifies the undisclosed supplier from the group signature. Identification of the undisclosed supplier is performed by a third-party auditor system requested to do so by the verifier device by using a group private key.

6 Claims, 13 Drawing Sheets

TRACEABILITY VERIFICATION SYSTEM, METHOD AND PROGRAM FOR THE SAME

CROSS-REFERENCE TO RELATED APPLICATIONS

This application is a divisional application claiming priority under 35 U.S.C. § 120 to U.S. Pat. No 8,055,589 issued Nov. 8, 2011, which in turn claims priority under 35 U.S.C. § 119 to Japanese Patent Application No. 2005-193236 filed Jul. 1, 2005 the entire text of which is specifically incorporated by reference herein.

BACKGROUND OF THE INVENTION

The present invention relates to a traceability verification system, a method and a program for the same, and more specifically to a system for enabling verification, while maintaining a configuration of a supplier confidential in a supply chain, and a verifying method and a program for the same.

Traceability is known as a technique that can trace a supply chain, which is a targeted object, by associating a plurality of objects. The supply chain here is an operational flow such as acquisition/manufacturing/sales/distribution of materials and parts from acquisition of materials to delivery the materials to the end user acknowledged as a big supply chain.

For example, when a plurality of parts are combined to manufacture a certain product, traceability technique can trace where the parts of the product are provided from, what kinds of process contributed to manufacture the product by the signature or the like. In order to realize traceability of the traceability technique, methods for effectively manage or trace data such as parts or a process history to be traced are developed. The signature here is a certificate indicating a source of goods or a product.

However, by realizing traceability, there is a possibility that information the supplier originally never wanted to make known may be discovered in the tracing process. Therefore, an approach for applying a group signature (D. Chaum, E. van Heijst, "Group Signature", Ad canves in Cryptology—EUROCRYPTO '91, pp. 257-265, Springer-Verlag, 1991) to a group which should be kept confidential and authenticating the group, while preventing a secret from being leaked, is considered.

As an example for applying a group signature to prevent a secret form being leaked, an anonymous authentication system of Japan Published Unexamined Patent Application No. 2004-320562 is known. With this system, a group signature is applied as an authentication basis for providing a service for an authenticated user without letting individual information known to a service provider. This system is appropriate for a scenario where members to be verified, service users, are not associated with each other and the member to be verified wants to protect his/her privacy and also wants to certify that he/she has an authority to use the service, and a scenario where a member administrator who manages all users of the group members has a high management authority.

BRIEF SUMMARY OF THE INVENTION

The above-mentioned system, however, does not describe a method which can be applied to a scenario with characteristics as below in a supply chain which is an object for solving the problems of the present invention. That is to say, the above-mentioned system cannot be applied to traceability for a supply chain which is assumed that, first, it has an arrangement with suppliers to be verified are associated with each other; second, it is a parent supplier who deals with a plurality of persons to be verified and not a person to be verified that wants to maintain information on a person to be verified confidential or certificate quality of an object provided by a person to be verified; and third, a parent supplier who manages group members or who selects a supplier to be registered in a group has a high authority.

As a background for taking account of preventing secret information of a supplier from being leaked, for example, traceability of parts in a supply chain consisting of parts plants which provide parts of a certain product, assembly plants and dealers will be considered. When a certain part has a failure, the plant from which the part was purchased can be traced with traceability applied. The dealer can verify whether a contracted plant purchases from and assembles in affiliated plants in previously indicated product level or not.

At the same time, information which one does not want to let a dealer know including a specific name of or detailed information on a plant which deals with a contracted plant, the code price of parts are also known. If trading conditions or customer information is known to a third-party, significant drawbacks will be resulted at the business front.

Therefore, it is required to enable verification whether a supplier is in a level approved by a tracer (a verifier) or not or whether a flow between suppliers is correct or not, while maintaining information confidential which a supplier does not want to make known. If some problems occur, an existence which can release confidentiality, i.e., a possibility to release confidentiality needs to be realized. If a problem occurs in any of supply chains, confidentiality is released, i.e., an individual undisclosed supplier or a specific flow between undisclosed suppliers can be identified to diagnose the cause of the problem. The present invention intends to realize a traceability system for fulfilling the above-mentioned openness, a possibility of verification, and a possibility of releasing confidentiality.

An exemplary object of the present invention is to realize a traceability system that is a new protocol to be applied to a scenario in the above-mentioned supply chain and realizes a necessary possibility of tracing (a possibility of verification), while considering preventing secret information on a supplier from being leaked which may be occur in tracing process. In order to achieve the above-mentioned object, exemplary aspects of the present invention have a configuration as below.

(1) To provide a traceability system applied to a supply chain, in which a deliverer receives a supply of parts from disclosed suppliers and undisclosed private suppliers to the delivery destination and ships products, including a signature generation sub-system for generating a signature chain from a signature made by a supplier manager device, a signatures made by a disclosed supplier device and a group signature made by private supplier devices as a group; a signature verification sub-system enabling a verifier device and a certificate authority device to collaborate to verify the generated signature chain, while maintaining confidentiality of the private suppliers, and a signature identification sub-system for identifying the private suppliers to a third-party auditor device.

According to the invention of (1), a supply chain in which disclosed suppliers and undisclosed suppliers are mixed can form a system including three sub-systems of a signature generation system for generating a disclosed signature of a disclosed supplier and a group signature of undisclosed suppliers as a signature chain, a signature verification sub-system for verifying the signature chain, and a signature identification sub-system including a third-party auditor, and fulfilling all of the above-mentioned openness and a possibility of verification and a possibility of releasing confidentiality. Each sub-system has characteristics as below.

(2) The signature generation sub-system includes means for the supplier manager device of a deliverer to register the private supplier as a group in the certificate authority device and for the private supplier to perform a group signature for the group based on a group certificate issued by the certificate authority device (for example, a group signature generating unit 313 in FIG. 2), means for generating the signature chain by a chain reaction of performing a signature of the disclosed supplier device and the group signature of the private supplier device according to the supply chain (for example, signature generating unit 213), means for the supplier manager device to further sign the signature chain and generating a signature chain to be a verifier (for example, signature generating unit 213), and means for sending the signature chain to the verifier device at the delivery destination (for example, to send via a network or to attach a signature to a product).

According to the invention of (2), suppliers to be kept confidential are previously registered in a certificate authority device of a third-party and the undisclosed suppliers sign as a group based on a group certificate issued by the certificate authority device when the undisclosed suppliers respectively deliver actual parts. Therefore, as a result, confidentiality of each undisclosed supplier can be kept.

(3) The signature verification sub-system includes means for the verifier device to verify the supplier manager of a deliverer from the signature chain by using a public key of the supplier manager device of a deliverer (for example, a disclosed supplier signature verifying unit 412), and means for the verifier device to request a public key of a group of the private suppliers from the certificate authority device and to divide signatures of a supplier manager device of the deliverer and a disclosed supplier device from the signature chain and to verify the private suppliers as a group by using the public key (for example, a PS signature verifying unit 413).

According to the invention of (3), the verifier device can verify information on each disclosed supplier including a supplier manager and information on the entire group of undisclosed suppliers from a signature (certificate) received when the product is delivered. Accordingly, the verifier device can maintain confidentiality to a verifier.

(4) The signature identification sub-system includes means for the verifier device to request the auditor device to identify the private supplier, and for the auditor device to identify the private suppliers and a flow between the private suppliers from the signature chain by using a group private key of the private suppliers (for example, a PS identifying unit 612).

According to the invention of (4), when each undisclosed supplier needs to be identified for some reason, a third-party of auditor device identifies it rather than a verifier device directly identifies it. Accordingly, the device can realize a possibility of releasing confidentiality, while maintaining confidentiality to the verifier.

By applying embodiments of the present invention, traceability to fulfill necessary traceability and confidentiality of secret information of a supplier in tracing process can be realized at the same time. A third-party for realizing a possibility of releasing confidentiality can address a problem. The traceability applied with the present invention can certify quality assurance, while keeping information confidential which significantly influences business front if it is known. Therefore, the traceability works effectively in many industries.

DETAILED DESCRIPTION OF THE INVENTION

Figure 1:
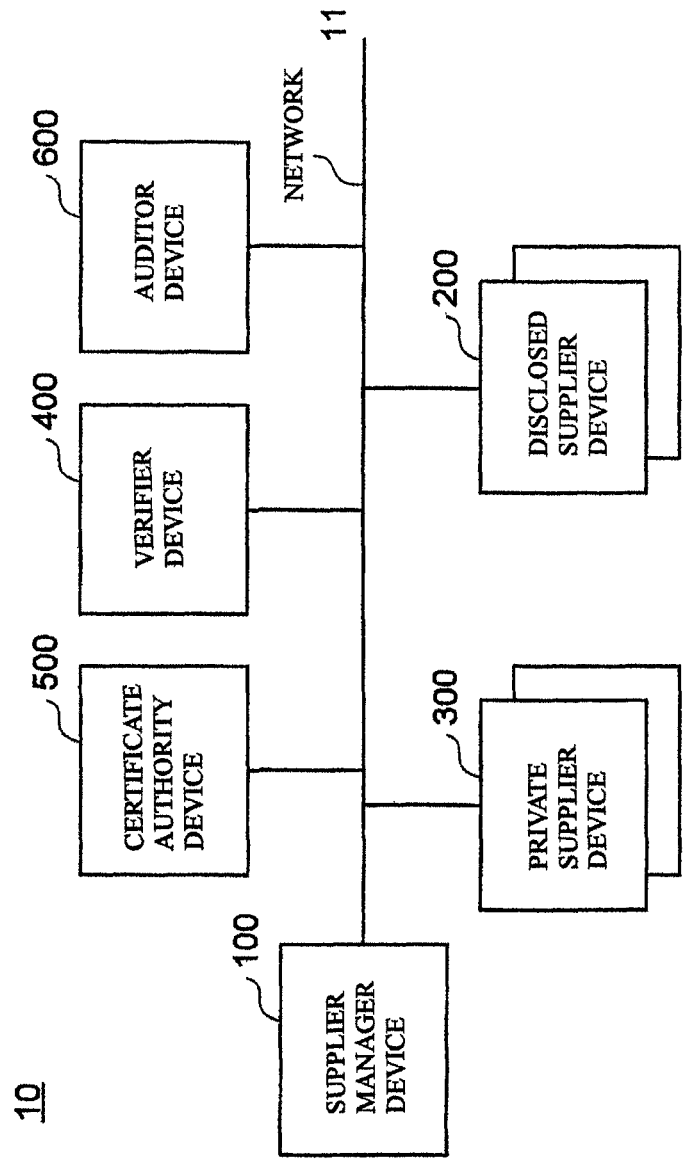
FIG. 1 is a block diagram of an entire traceability system according to an embodiment of the present invention.

The present invention will be described with reference to embodiments of the invention. The embodiments below do not limit the present invention described in claims and all the combinations of components described in the embodiments are not necessary for means to solve the invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 shows a block diagram of an entire traceability system 10 according to an embodiment of the present invention. This embodiment includes a device belonging to six types of entities as below. The entity is a substance dealt as a unit in the system (usually, agency, institution, and individual). Although FIG. 1 shows a configuration in which devices are connected with each other via a network 11, a device of each entity only needs to have means for sending and receiving necessary data and all the entities need not to be connected with each other via a network. Each device in FIG. 1 is a computer system including at least one computer.

A supplier manager device 100 is, for example, a system of an entity which manages a group of suppliers which supply parts forming its own product, assembles the end product and ships the product. The supplier manager device 100 requests a certificate authority device 500 to be described later to register private suppliers as a group which need to be maintained confidential to a delivery destination among suppliers.

A disclosed supplier device 200 is a device of a supplier disclosed to a verifier. The verifier here is an entity to which a supplier manager delivered the end product, or an entity which is requested to verify. A plurality of disclosed suppliers may be present. Therefore, a plurality of disclosed supplier devices 200 may also be present. A supplier manager is also a kind of a disclosed supplier.

A private supplier device 300 is a device of a supplier which is maintained confidential to a verifier. Usually, a plurality of private suppliers are present, and accordingly a plurality of private supplier devices 300 are also present. The private suppliers are certified as belonging to an appropriate group managed by a supplier manager device 100 when it is registered in a group in a certificate authority device 500 to be described later and receives a group certificate.

The verifier device 400 is a device of a verifier of a product delivered from a supplier manager as mentioned above, and verifies a route along which the supplier supplied parts forming the delivered product. The verifier device 400 can verify and identify each disclosed supplier (including a supplier manager). For private supplier devices 300, however, the verifier device 400 can verify only whether a private supplier corresponding to each of the private supplier devices 300 belongs to an appropriate group indicated by the supplier manager device 100 but cannot identify each private supplier. If identifying of a private supplier is required, an auditor device 600 to be described later is requested to do.

A certificate authority device 500 is a device belonging to a third-party of a certificate authority. The certificate authority device 500 examines a private supplier in response to a request from a supplier manager device, registers the private supplier, determines whether the private supplier belongs to a registered group or not, and if appropriate, issues a certificate indicating that the private supplier belongs to a group to the verifier device 400.

The auditor device 600 is a device of a third-party of an auditor. The auditor device 600 is an only device which can identify each of private suppliers. In response to request from the verifier device 400, the auditor device 600 identifies each private supplier as required. The auditor may also function as the above-mentioned certificate authority. In such a case, the certificate authority device 500 and the auditor device 600 belong to one entity.

Figure 2:
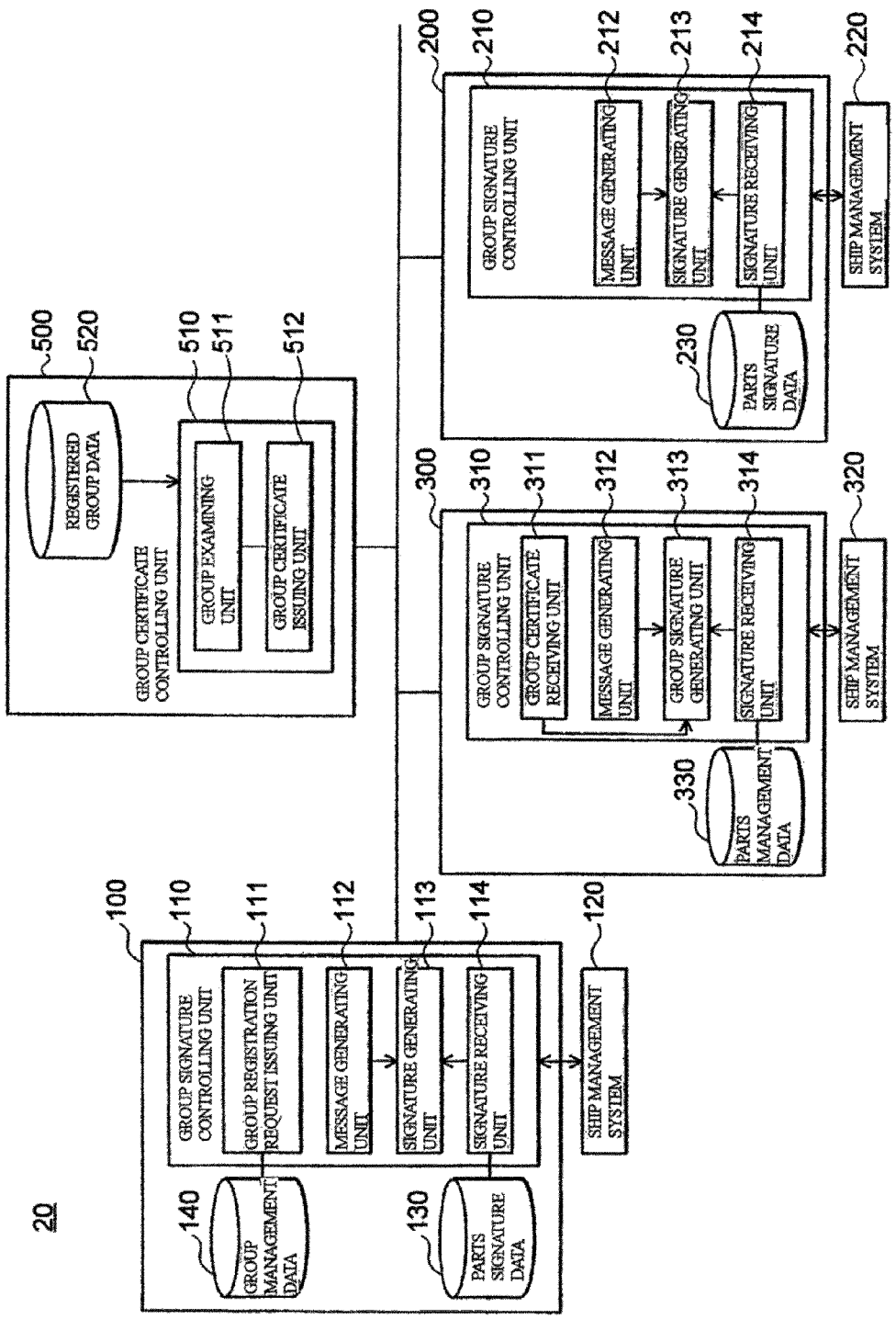
FIG. 2 is a block diagram of a signature generation sub-system according to an embodiment of the present invention.

FIG. 2 shows a part forming a signature generation sub-system 20 in the traceability system 10 of FIG. 1. The signature generation sub-system 20 includes a supplier manager device 100, a certificate authority device 500, a private supplier device 300 and a disclosed supplier device 200. Although, usually a plurality of private supplier devices 300 and a plurality of disclosed supplier devices 200 are present, FIG. 2 shows only one of respective devices omitting the rest.

The supplier manager device 100 has a group management data 140 for managing a plurality of private suppliers and a group signature controlling unit 110 for controlling exchange of signatures with the other devices. The signature here is a certificate showing a source of products or parts and, in particular, a digital signature in the present traceability system. The digital signature may be any of known techniques.

The group signature controlling unit 110 collaborate with a ship management system 120 in its company, retrieves a signature corresponding to a part used in a product to be shipped from a parts signature data 130 for managing signatures of delivered parts, and generates a signature for its own products by the signature generating unit 113. Although the generated signature is sent to a destination of shipment, the signature may be directly attached to a product. The group signature controlling unit 110 includes a group registration request issuing unit 111 for issuing a request of registering in a group for the certificate authority device 500. Information on an authorized private supplier is saved in a group management data 140. The signature generating unit 113 can include a message to a destination of shipment in a signature. The signature generating unit 113 may receive a message from a message generating unit 112 as required.

The private supplier device 300 has a group signature controlling unit 310 as the supplier manager device 100 does and it is connected with a ship management system 320 in its company. The group signature controlling unit 310 includes a group certificate receiving unit 311 for receiving a group certificate issued from the certificate authority device 500 and a group signature generating unit 313 for generating a group signature based on the certificate. The group signature to be generated is common to a group including private suppliers. A message generating unit 312, a ship management system 320, a signature receiving unit 314, and a parts management data 330 are basically the same as those in the supplier manager device 100, thus, they are omitted from description.

The disclosed supplier device 200 has a configuration similar to that of the private supplier device 300. Unlike the private supplier device 300, the disclosed supplier device 200 does not receive a certificate from the certificate authority device 500. Therefore, no part corresponding to the group certificate receiving unit 311 is present. The disclosed supplier device 200 is different from the private supplier device 300 in that a signature generating unit 213 generates its own signature and not a group signature. Considering that the disclosed supplier device 200 forms a group by itself having its own certificate instead of receiving a group certificate, the signature generating unit 213 is the same as a group signature generating unit 313 in the private supplier device 300. Both of the devices can be built by the same signature generating algorithm.

The certificate authority device 500 includes a group examining unit 510 for receiving a request from a supplier manager device 100 and examining whether or not to register a private supplier to a specified group, and a registered group data 520 for saving information on a registered group. After registered in a registered group data 520, the group certificate issuing unit 512 issues a group certificate to a private supplier device. Based on the certificate, the private supplier device 300 can perform a group signature to certify that it belongs to an authorized group when it ships parts thereafter.

Figure 3:
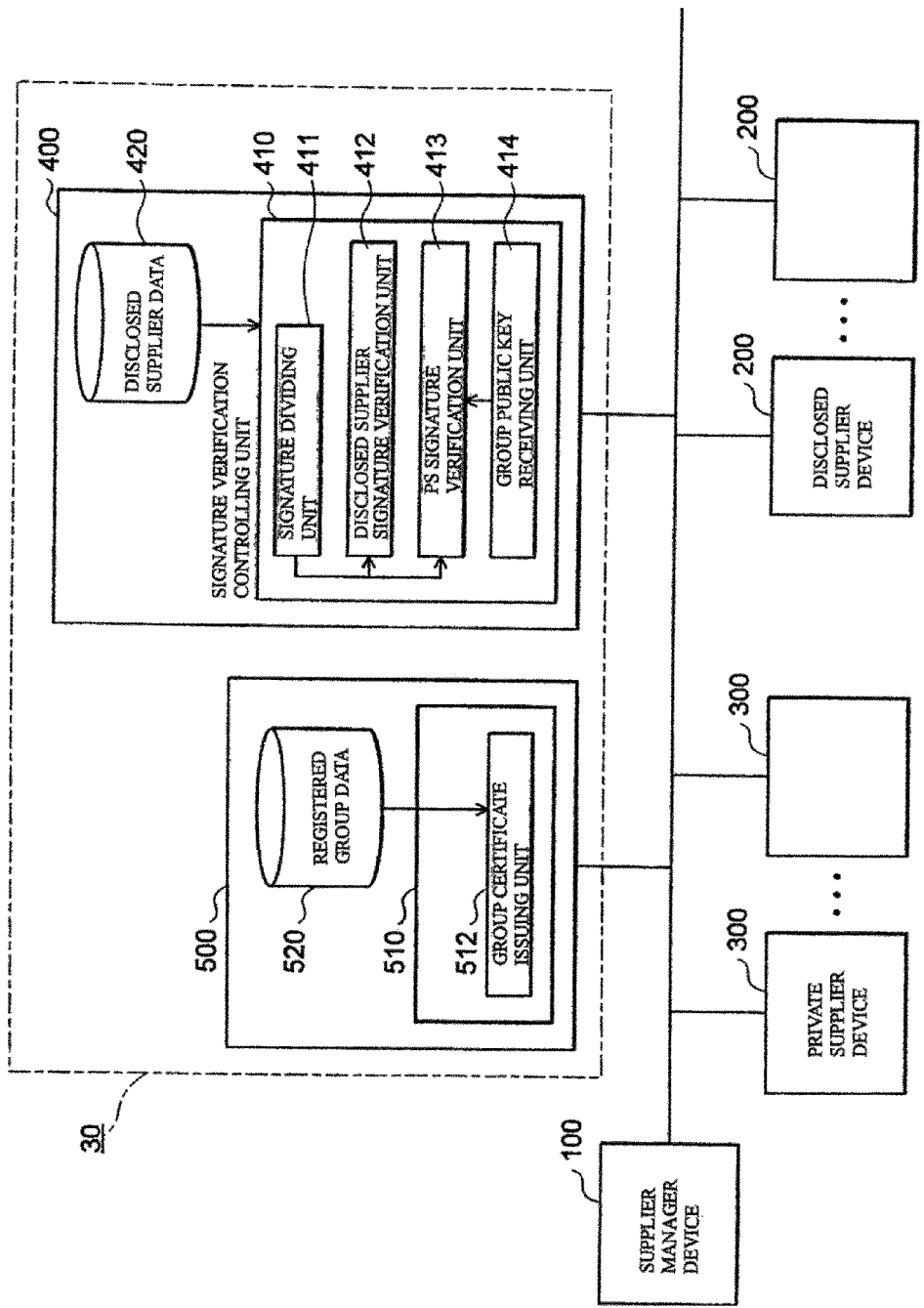
FIG. 3 is a block diagram of a signature verification sub-system according to the embodiment of the present invention.

FIG. 3 shows a part forming a signature verification sub-system 30 in the traceability system 10 of FIG. 1. The signature verification sub-system 30 includes a certificate authority device 500 and a verifier device 400. It is assumed that a verifier signature chain has been shipped with products from the supplier manager device 100 to the verifier device 400. The verifier signature chain here is a signature chain to be finally verified including a signature of a supplier manager device 100 and also including signatures of all the suppliers of parts forming a product. The group certificate issuing unit 512 of a certificate authority device 500 retrieves a group public key from a registered group data 520 in response to a request from the verifier device 400 and sends the group public key to a group public key receiving unit 414 of a verifier device 400.

The verifier device 400 includes a signature verification controlling unit 410, which includes a signature dividing unit 411, a disclosed supplier signature verification unit 412, a PS (private supplier) signature verification unit 413 and a group public key receiving unit 414. The verifier signature chain received from the supplier manager device 100 is verified by the disclosed supplier signature verification unit 412 with a public key of a disclosed supplier retrieved from a disclosed supplier data 420. Then, the PS signature verification unit 413 acquires a group public key (certificate for group verification) of private supplier devices 300 from the certificate authority device 500 via a group public key receiving unit 414 and verifies private supplier devices 300 as a group. If a disclosed supplier which signed before the private supplier is present, the disclosed supplier can be verified with the public key of the disclosed supplier. The algorithm for creating a public key may be any of known techniques.

Figure 4:
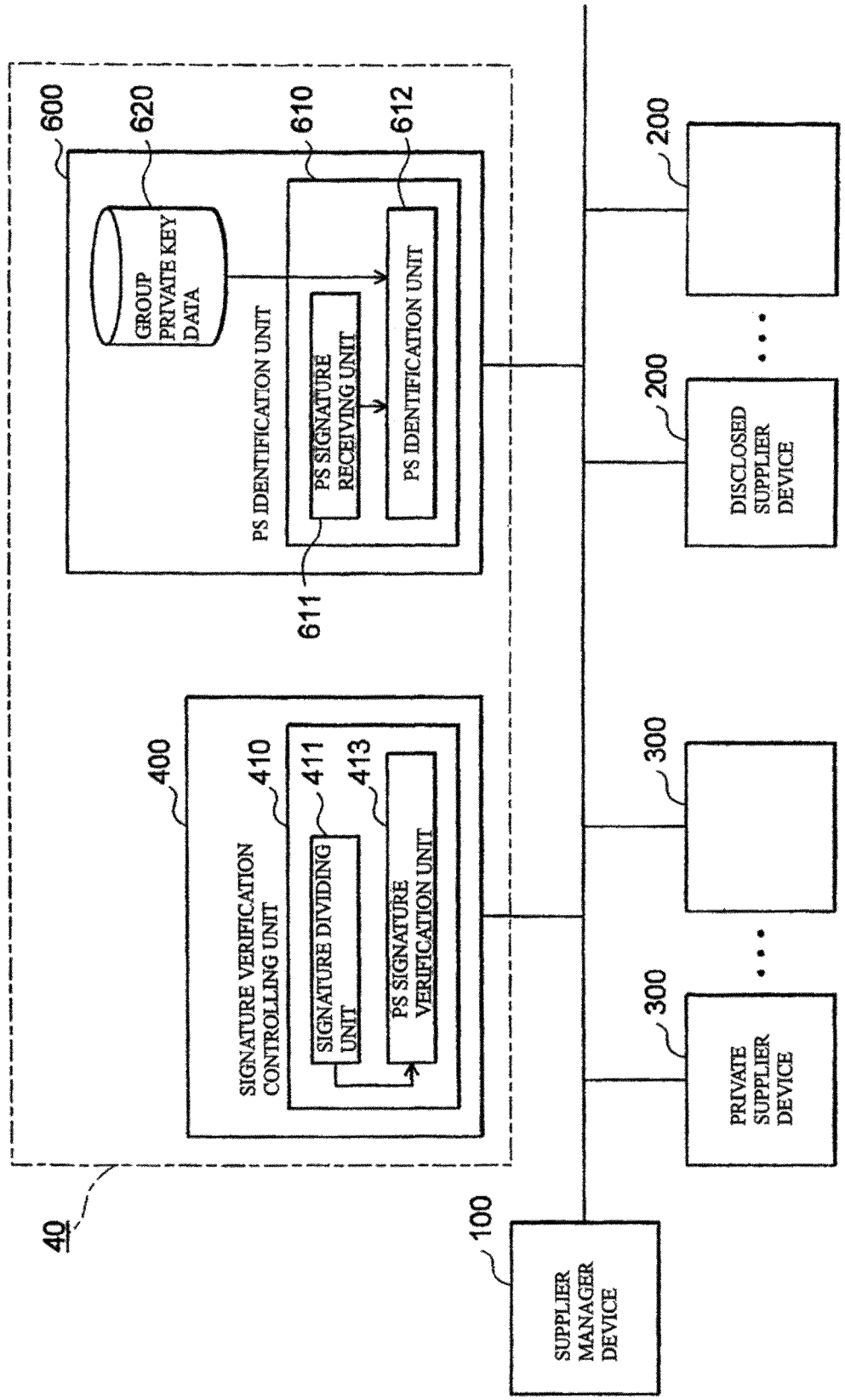
FIG. 4 is a block diagram of a signature identification sub-system according to the embodiment of the present invention.

FIG. 4 shows a part forming a signature identification sub-system 40 from the traceability system 10 of FIG. 1. The signature identification sub-system 40 includes the above-mentioned verifier device 400 and auditor device 600. As mentioned above, the verifier device 400 removes a signature of a disclosed supplier which is signed after a private supplier from a verifier signature chain. The resulted signature of the private supplier device 300 is sent by the PS signature verification unit 413 to the PS signature receiving unit 611 of the auditor device 600. The auditor device 600 can retrieve a group private key from group private key data 620 and identify private supplier devices 300 individually by the PS identification unit 612.

Each of the sub-systems of FIGS. 2 to 4 can be realized by a program with a corresponding function on a usual computer system. As a storage medium for storing the above-mentioned program, a magnetic storage medium such as a Floppy (Registered Trademark) disk, an optical storage medium such as CD-ROM, DVD and PD, a magneto-optical storage medium such as MD, a tape medium, semiconductor memory such as an IC card as well as a hard disk can be used. The above-mentioned program may be provided to a computer system by using a storage device such as a hard disk, RAM or the like provided in a server system connected with a network as a medium.

Figure 5:
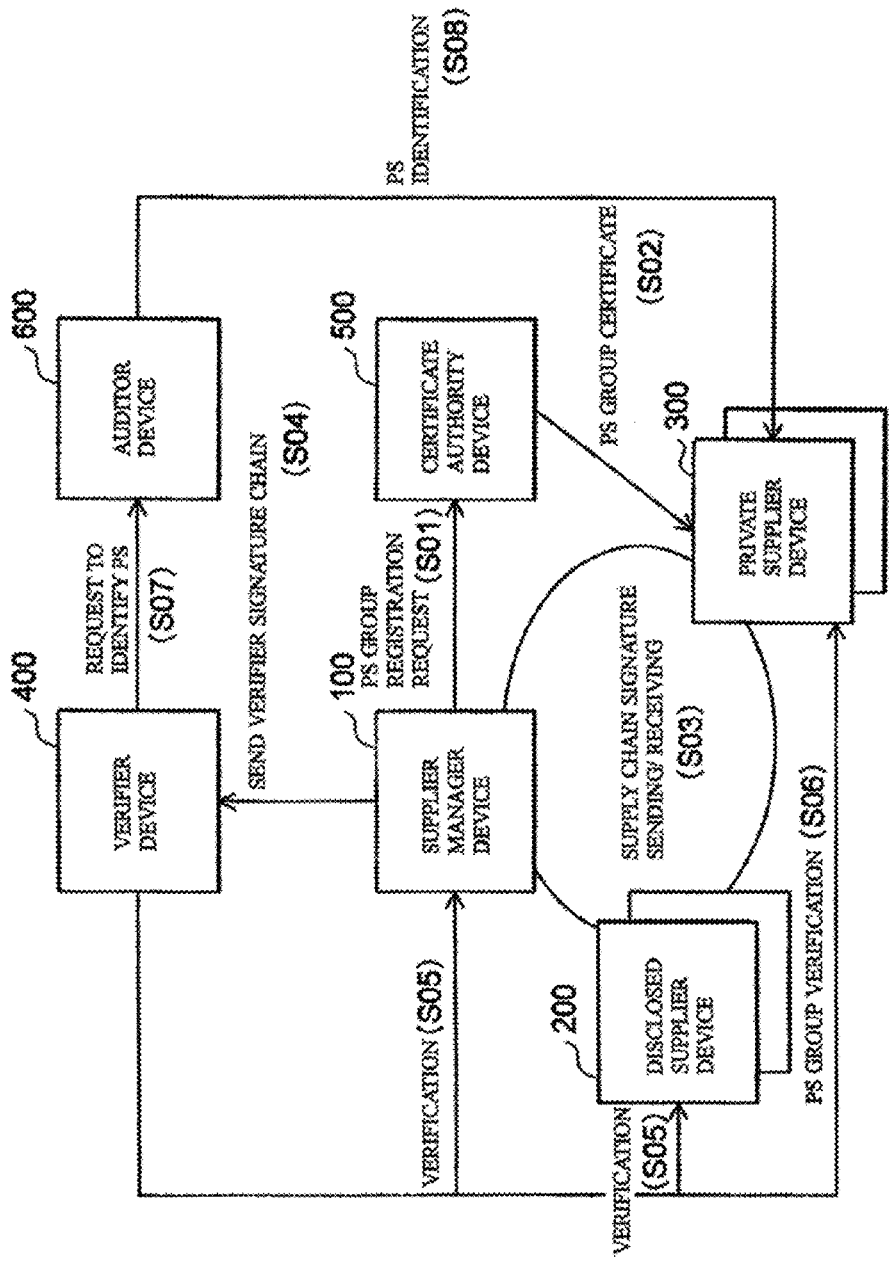
FIG. 5 is a diagram of the entire flow of a traceability system.

FIG. 5 collectively shows the entire flow between devices of the present embodiment. Although outlined steps will be shown below, each step is not limited to follow the order shown.

(a) The supplier manager device 100 requests the certificate authority device 500 to register a private supplier device as a group (step S01).

(b) The certificate authority device 500 issues a group certificate to the private supplier device 300 (step S02).

(c) A supply chain is formed according to an actual transaction of products or parts among the disclosed supplier device 200, the private supplier device 300 and the supplier manager device 100, and a signature is sent and received with the products or the parts (step S03). The final receiver of the signature chain is usually a supplier manager device 100.

(d) The supplier manager device 100 sends a verifier signature chain to the verifier device 400 when it ships the products (step S04).

(e) The verifier device 400 verifies the supplier manager device and the disclosed supplier device with respective public keys (step S05), and performs PS group verification on the private supplier device with a group public key (step S06).

(f) If the verifier device 400 needs to identify another private supplier device 300, it issues a request to identify a PS to the auditor device 600 (step S07).

(g) The auditor device 600 identifies the private supplier device 300 (step S08).

A scenario which is an object of a problem to be solved by an aspect of the present invention will be described based on a simple example.

G is an automobile dealer which contract with F. F is a manufacturer which delivers automobiles to G. A is a parts plant affiliated with F. Information on A is also disclosed to G. B to E are parts plants affiliated with F but detailed information on B to E are confidential to G.

Assuming that plants from A to F and an automobile dealer G have relationship as below:

(1) A delivers parts it manufactured to B.
(2) B processes parts received from A and delivers them to D.
(3) C delivers parts it manufactured to D.
(4) D combines parts received from B and C, processes the parts and delivers them to E.
(5) E processes parts it received from D and delivers them to F.
(6) F delivers automobiles to G.

Figure 7:
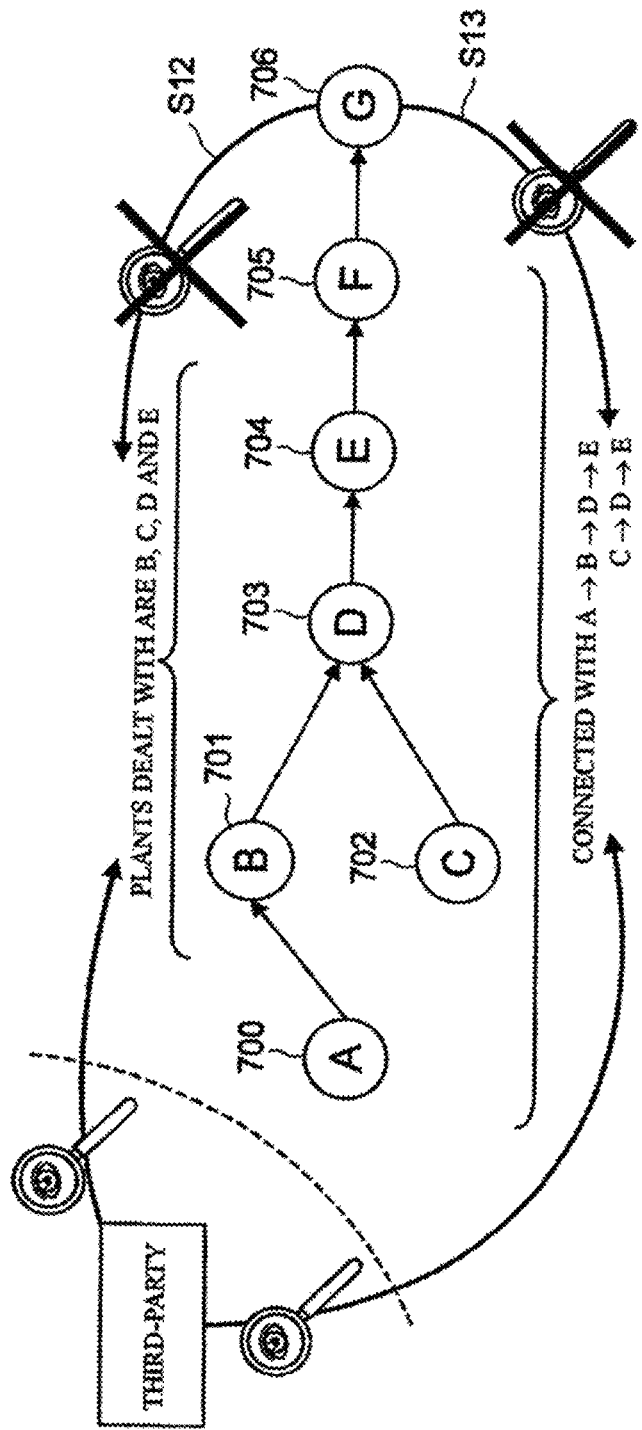
FIG. 7 is a diagram showing a possibility of verification and a possibility of releasing confidentiality which are requirements to solve the problem.

That is to say, that forms a supply chain as shown in FIG. 7. When F contracts with G, F indicates that plants affiliated with F are Japanese plants in product level A or upper (assuming that plants are ranked from AAA to DDD).

In this scenario, the traceability needs to realize items below:

(1) G wants to verify that the automobiles delivered from F are manufactured in affiliated plants as indicated by F with parts manufactured by A.
(2) F wants to keep detailed information and transactions of affiliated plants confidential to G.
(3) When a problem occurs in a supply chain, it wants to identify the plant and seeks the cause of the problem.

In order to solve the problem in this scenario, a possibility of verification and confidentiality need to be considered as below.

Figure 6:
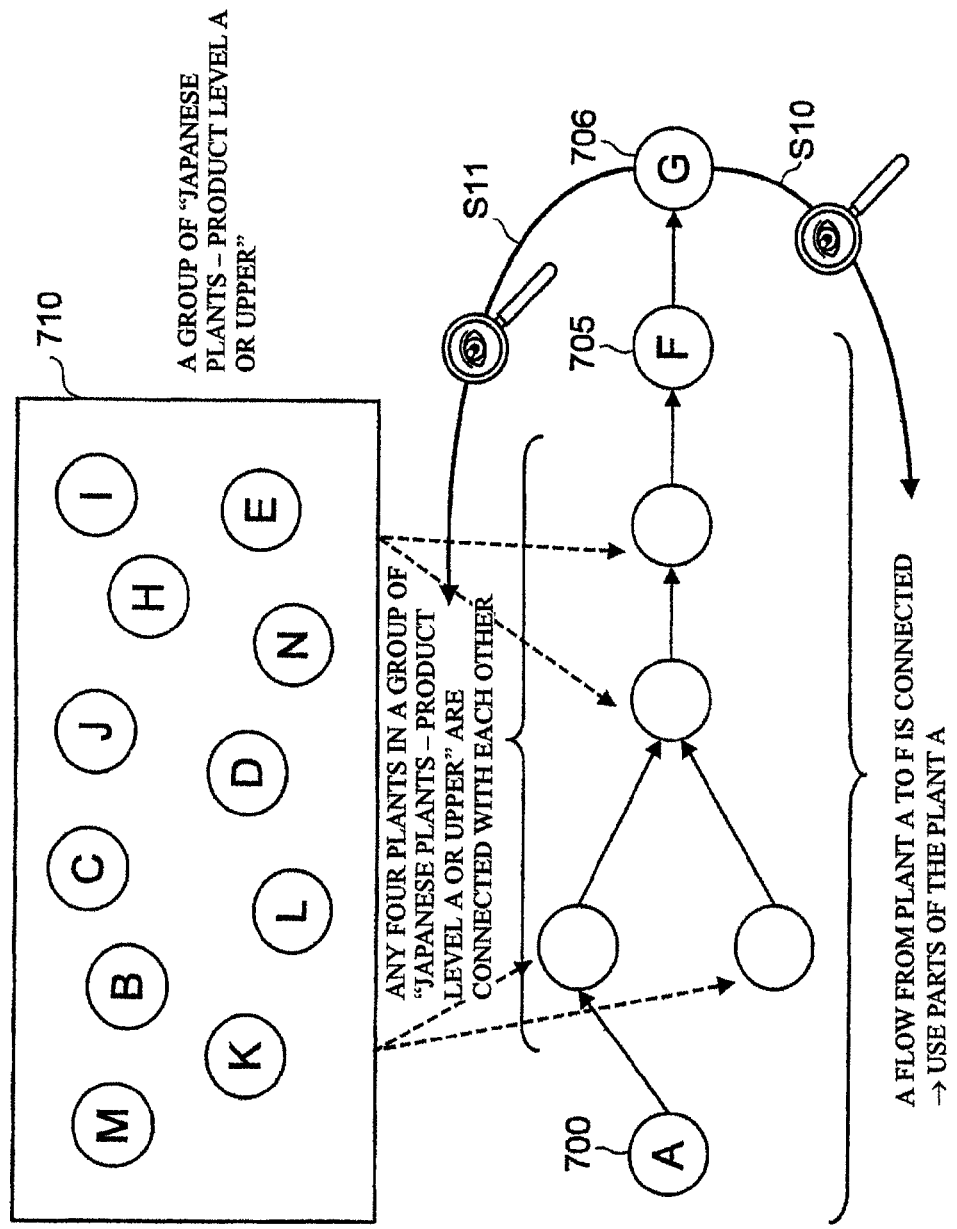
FIG. 6 is a diagram showing a possibility of verification which is a requirement to solve the problem.

Items which can be verified in this example are information which can be verified by G, i.e., information which may be disclosed to G. In this scenario, two items below can be verified (FIG. 6).

(1) The automobiles delivered by F (705) are manufactured by using parts manufactured by A (700). For the automobiles, parts are manufactured, processed and assembled in four plants since the parts are purchased from A (700) until they are delivered to F (705) (step S10).
(2) The above-mentioned four plants are plants affiliated with F and are Japanese plants in product level A or upper (step S11).

Confidential items in this example are information which cannot be verified by G (706) and which cannot be known from information disclosed to G (706). In this scenario, two items below are maintained confidential (FIG. 7).

(1) Japanese plants in product level A or upper which deal with F (705) are B (701), C (702), D (703) and E (704).
(2) A plant which purchases parts from A (700) is B (701), a plant which delivers parts to F (705) is E (704). B (701) and C (702) deliver parts to D (703), which delivers parts to E (704).

A possibility of releasing confidentiality as below will be defined.

A possibility of releasing confidentiality is that B to E or a specific flow between B and E can be identified when a problem occurs in a supply chain and the cause needs to be sought. In this scenario, confidential items can be identified under the constraints below (FIG. 7).

The constraints here are shown below.

(1) Authority to identify is only given to a third-party of the supply chain.
(2) Confidentiality to G (706) is maintained.
(3) The third-party with authority identifies in response to a request from G (706).

By realizing the above-mentioned possibility of verification and confidentiality at the same time, G can verify whether F purchases parts from an indicated plant or not, or whether F uses the parts specified by G or not. In this manner, quality of the product is guaranteed. F can certify to G that it deals with the indicated plants, while maintaining detailed information on plants it deals with confidential. Therefore, usually, by realizing a possibility of verification and confidentiality, G and F can fulfill requirements respectively. When a problem occurs, by realizing a possibility of releasing confidentiality, a third-party can identify and verify B to E, and clarify the cause of the trouble, while maintaining B to E confidential to G.

In order to realize the above-mentioned requirement, the present invention adopts a realizing system by using a group signature for a private supplier as mentioned above. The group signature has five features of unforeability, anonymity, unlinkability, identifiability and exculpatability. The unforeability means that a signed sentence cannot be forged, and the anonymity means that it is difficult for a person other than a predetermined administrator to identify a person who signed for any signed sentence. The unlinkability means that it is difficult for a person other than predetermined administrator to determine whether two different signed sentences are generated by the same member or not. The identifiability means that a predetermined administrator can whenever identify a person who signed for any signed sentence. The exculpatability means that a member is not to be blamed for anything other than a signed sentence which made by the member.

FIGS. 8 to 11 show details of the entire flow shown in FIG. 5. For simplicity, the supplier manager device 100 in FIG. 1 is described as SM, the private manager devices 300 are described as PS1, PS2, . . . , PSn, the disclosed supplier devices are described as S1, S2, the verifier device 400 is described as V, the certificate authority device 500 is described as CA, and the auditor device 600 is described as AS.

Here, a flow, through which some messages are sent from S1 to n PSs and from PSn to S2 (and to SM) and V receives the messages, will be considered. The procedure of issuing and informing of a certificate, signing to a message, and a procedure of verifying a signature, and a procedure of identifying a person who signed by AS will be shown below, respectively.

Figure 8:
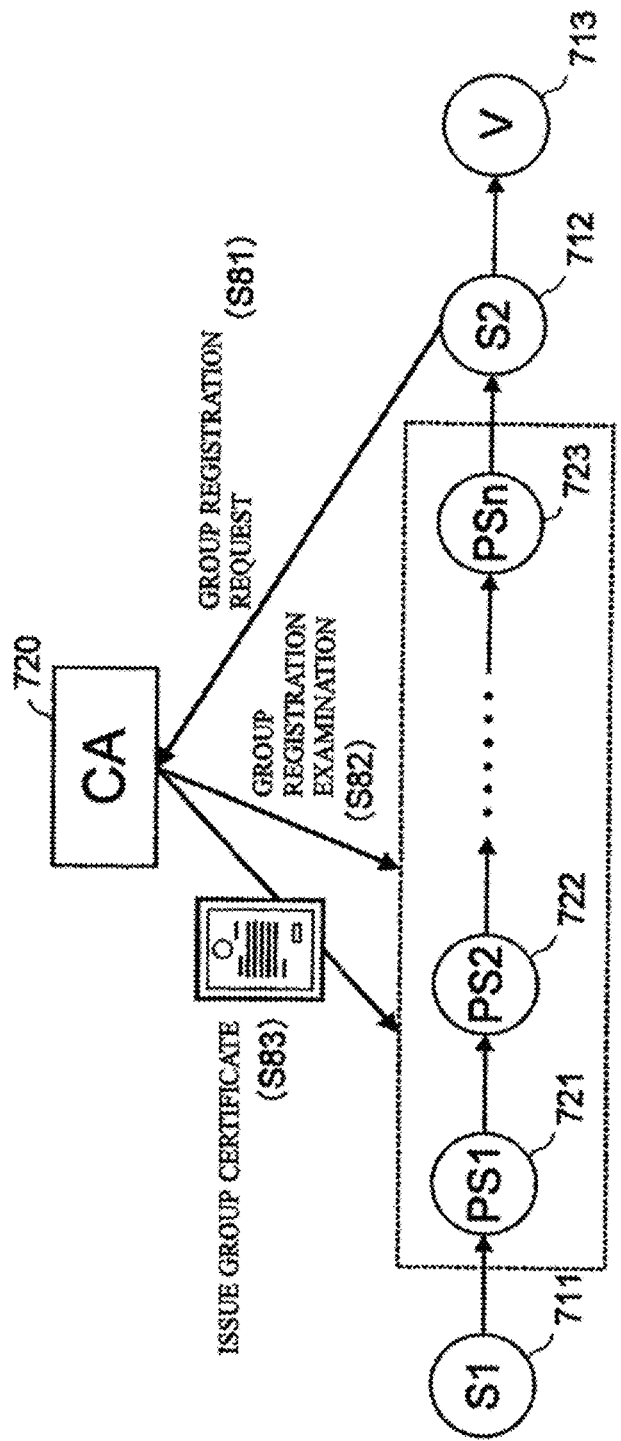
FIG. 8 is a diagram showing issuing and informing a certificate.

FIG. 8 shows issuing and informing the certificate. First, S2 (and SM) requests the certificate authority device CA to register PS1, PS2, . . . , PSn to be managed in a specified group (step S81). Next, CA examines whether each PS is appropriate for the group or not (step S82) and if it is approved as appropriate, it issues a group certificate for each of PS1, PS2, . . . , PSn (step S83). Then, each PS can perform an approved group signature by receiving a group certificate issued by the CA (720).

Figure 9:
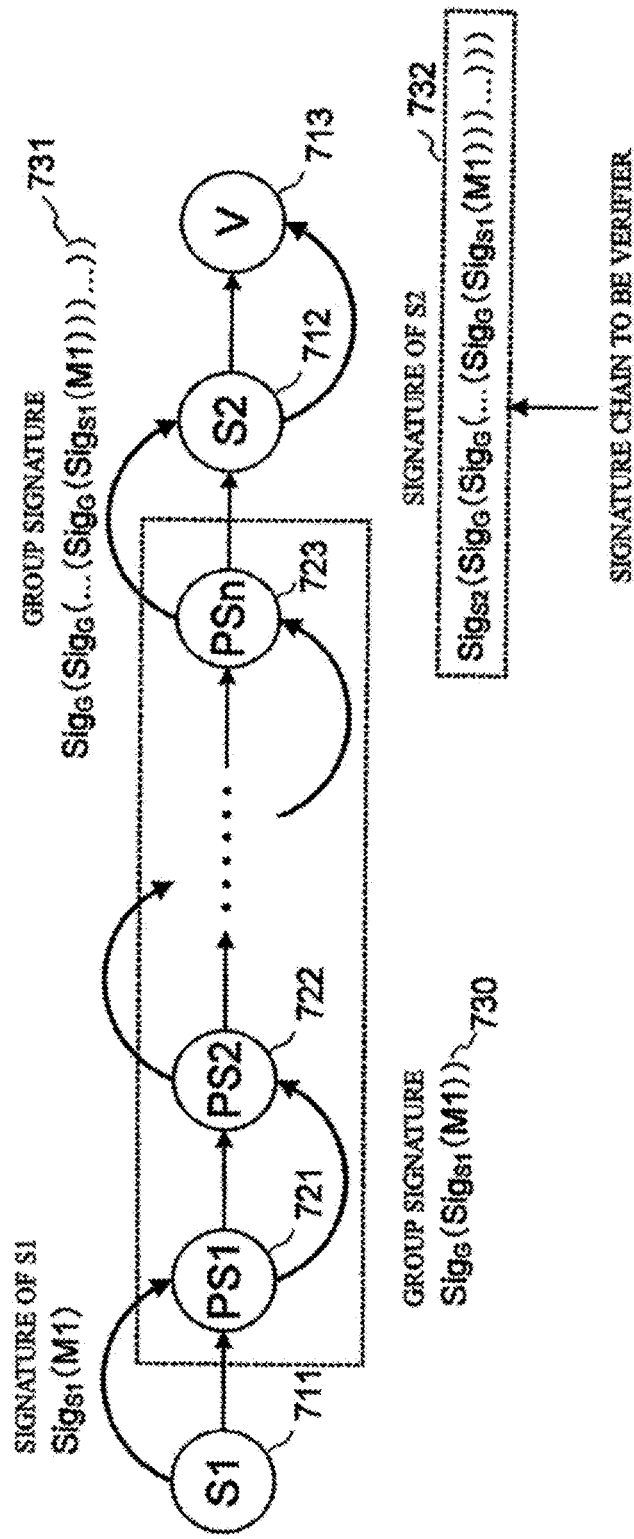
FIG. 9 is a diagram showing a method for generating a signature chain.

FIG. 9 shows generation of a signature chain. First, S1 signs a message M1. This is called Sigs1 (M1). Next, PS1 performs a group signature on the message Sigs1 (M1) with a signature received from S1. Assuming a signature by a group member as SigG, a signature by PS1 is $$Sig_G(Sig_{S1}(M1)) \quad \text{(expression 1)}$$

Similarly, PS2 to PSn perform group signature in order, respectively. The signature by PSn is $$Sig_G(Sig_G(\ldots(Sig_G(Sig_{S1}(M1)))\ldots)). \quad \text{(expression 2)}$$

Finally, S2 (and SM) signs. The sign of S2 is $$Sig_{S2}(Sig_G(Sig_G(\ldots(Sig_G(Sig_{S1}(M1)))\ldots))). \quad \text{(expression 3)}$$

V receives a signature chain, which will be the above-mentioned verifier (expression 3). Although an example where only S1 is assumed to issue a message M1 is described in the above-mentioned example, the other PS and S2 can also issue a message. For example, if S1 issues a message M1 and PS1 issues a message M2, a verifier signature chain will be $$Sig_{S2}(Sig_G(Sig_G(\ldots(Sig_G(Sig_{S1}(M1),Sig_G(M2)))\ldots))). \quad \text{(expression 4)}$$

Figure 10:
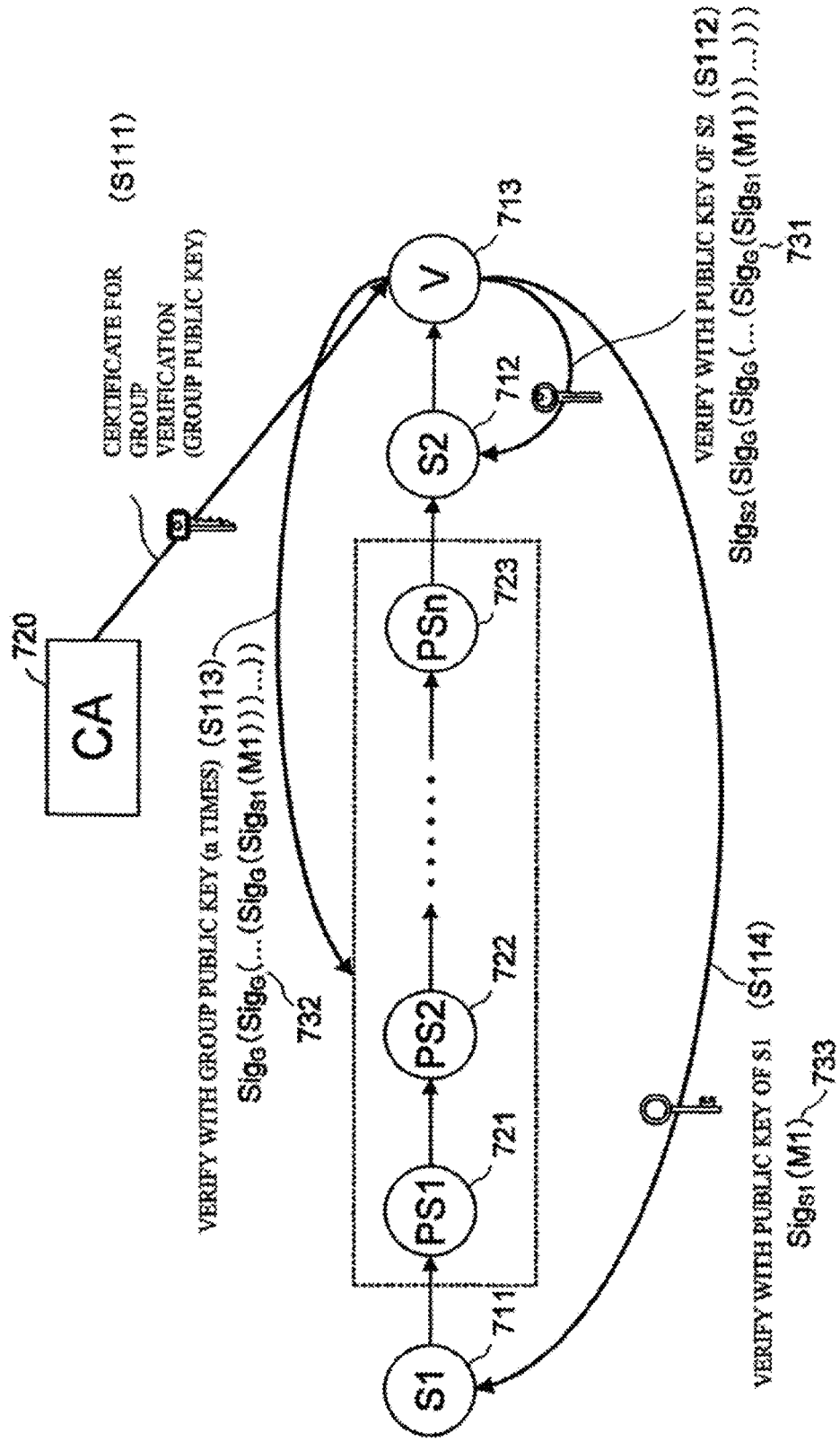
FIG. 10 is a diagram showing a method for verifying a person who signed.

FIG. 10 shows a procedure of signature verification. First, CA (720) is requested to send a certificate (a group public key) indicating "PS belongs to a group indicated by SM" (step S111). Next, S2 is verified by using a public key of S2 from the signature chain 731 (step S112). And, n PSs are verified by using a group public key from a signature chain 732 excluding a signature of S2 (712) (step S113). Finally, S1 is verified by using a public key of S1 from a signature chain 733 excluding n group signatures (step S114).

Figure 11:
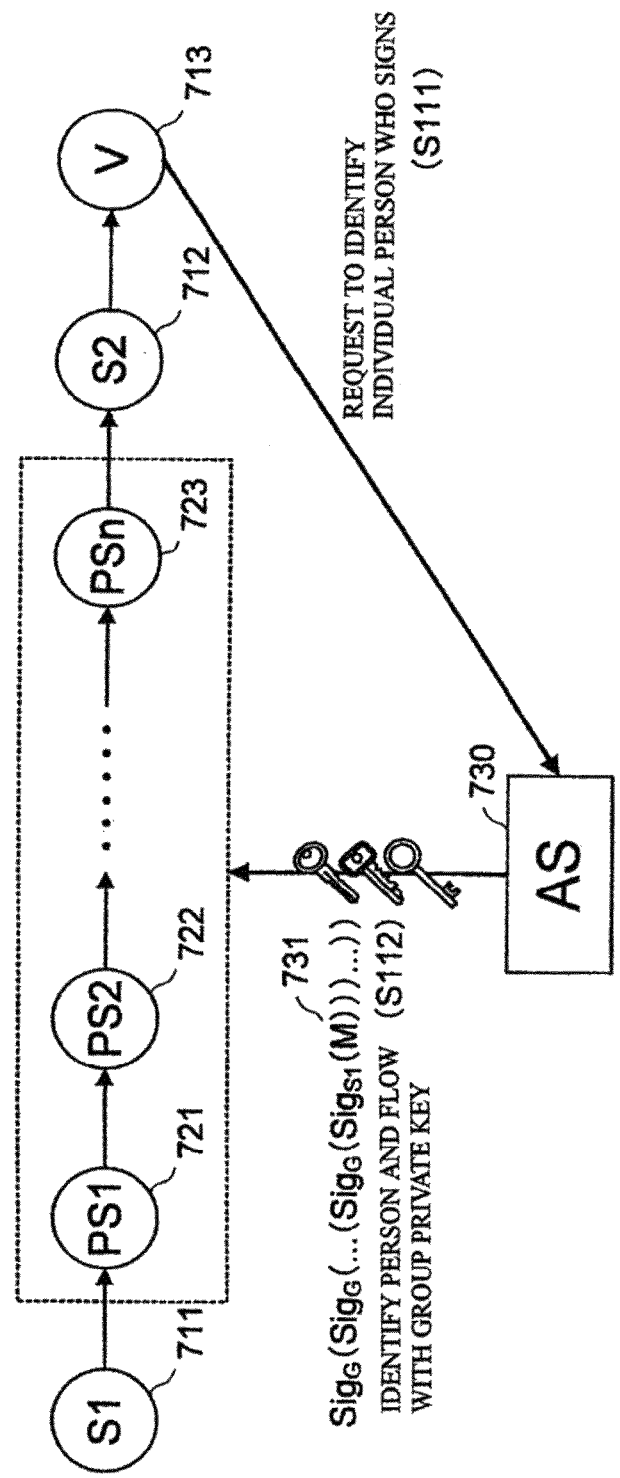
FIG. 11 is a diagram showing a method for identifying a person who signs.

FIG. 11 shows a procedure of identifying a person who signs. First, V (713) requests the auditor device AS (730) to identify each of group signatures (step S111). Next, AS (730) identifies PS1 (721), PS2 (722), ... PSn (723) and a specific flow between the PSs from a group signature chain 731 by using a group private key (step S112).

Here, a possibility of verification, confidentiality and a possibility of releasing confidentiality realized by this system will be considered.

This system can verify things shown below. Suppliers forming a flow sign messages to pass onto the next supplier respectively and create a signature chain. If suppliers are disclosed suppliers, it is known that a message is sent from each of them, while if suppliers are PS, it is known that a message is sent from a person belonging to a group. As how many PSs signed is known from the signature chain, it is known how many PSs the flow passes. By verifying a signature chain with a group public key, it is known that PS approved by CA signed the message.

With this system, items shown below will be maintained confidential even after verification. As PS uses a group signature, the PS cannot be identified as PS1, PS2, ..., PSn. It is apparent that a message is sent from S1 to PS and from PS to S2 by a signature chain, but it is not apparent that a message is sent from S1 to PS1 and from PSn to S2. It is apparent that a message is sent from PS to PS by a signature chain, but it is not apparent that a message is sent from PS1 to PS2, from PS3 to PS4, ..., and from PSn-1 to PSn.

As only AS can identify PS and a specific flow between PSs with this system, this system can seek the cause of a problem, while maintaining confidentiality to V.

From the above description, it is apparent that this system can realize traceability to fulfill openness and a possibility of verification. As AS can identify a person who performs a group signature, the person who performed the group signature can be identified and verified if some problems occur during the flow. The method for realizing that is apparent from FIG. 11.

Figure 12:
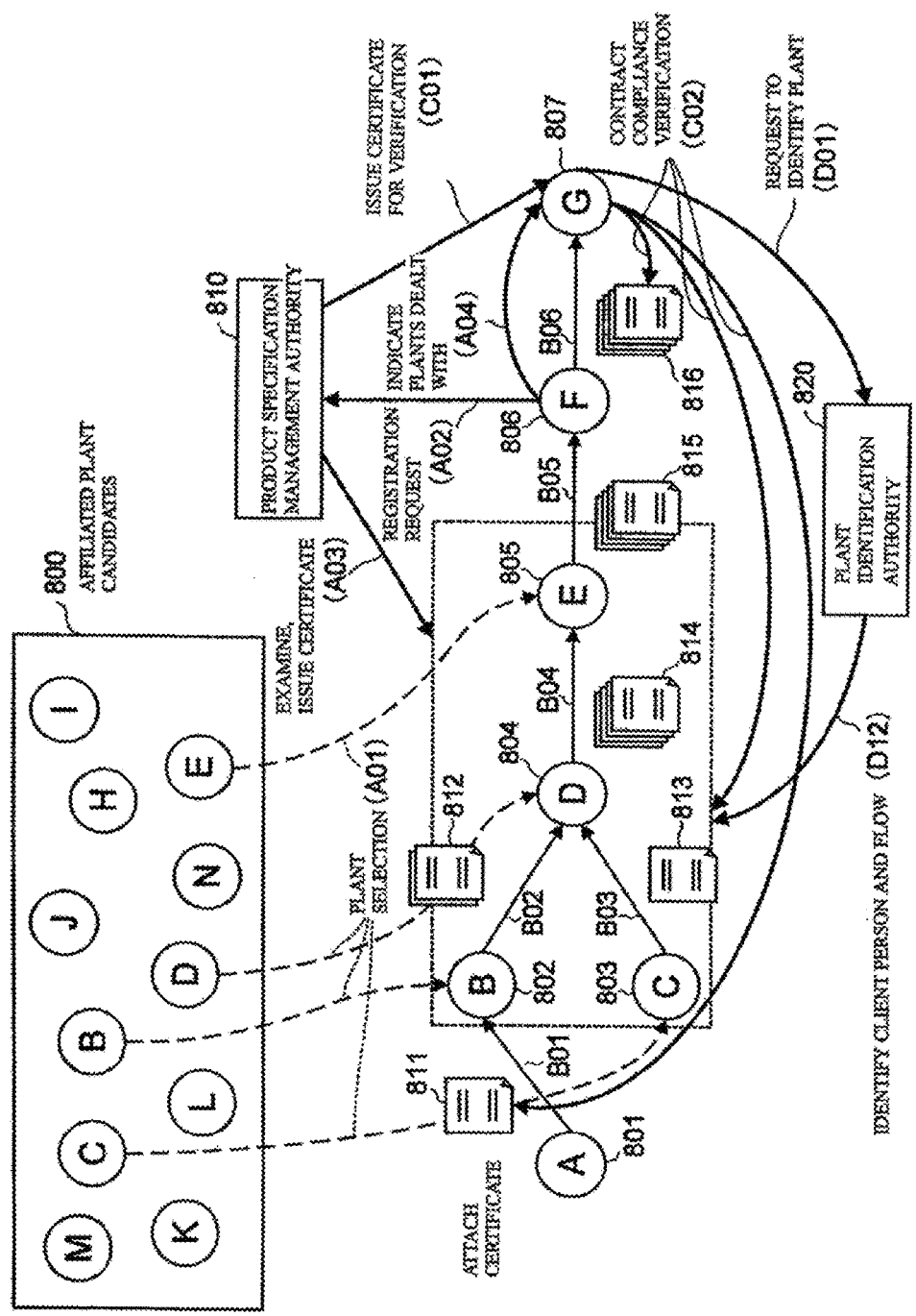
FIG. 12 is a diagram showing a specific example 1 of the embodiment.

FIG. 12 shows a specific example of applying the present invention to traceability of automobile parts. In the specific example, plants and dealers are as below. The product specification management authority 810 is a certificate authority CA, a plant A is a disclosed supplier S, plants B, C, D and E are private suppliers PS1, PS2, PS3, PS4 and PS5. A plant F is a supplier manager SM and also a disclosed supplier S2. A dealer is a verifier V and a plant identification authority is an auditor. Each entity is assumed to have a device corresponding to that in FIG. 1. For simplicity, signs A, B, C, D, E, F and G will be used in description.

In the figure, arrows from A01 to A04 indicate a procedure (issuing and informing a certificate), arrows from B01 to B06 indicate a contract compliance certificate (generating a signature chain), arrows from C01 to C02 indicate contract compliance verification (verifying a signature) and arrows D01 to D02 indicate a flow of identifying the cause of a problem and preventing it from being enlarged (identifying a person who signs).

The plant F (806) selects candidate plants B, C, D and E which can likely be registered in a group of "Japanese plants—product level A or upper" among the affiliated plant candidates 800 (step A01). In order to register the selected plants B to E in the group of "Japanese plants—product level A or upper", the plant F (806) requests the product specification management authority 810 to examine the plants. The product specification management authority 810 examines the product level of the plants B to E. If the plants fulfill the specification, it issues a certificate indicating that it is in the group of "Japanese plants—product level A or upper". When the plant F (806) contracts with a dealer, it indicates that it only deals with Japanese plants in the product level A or upper as its affiliated plants.

The plant A (801) attaches its own certificate 811 when it delivers parts. The plant B (802) attaches the group certificate 812 issued by the product specification management authority with the certificate it received from the plant A when it delivers parts. Similarly, the plant C (803) to the plant E (805) attach group certificates with the certificates they received when they deliver parts. The plant F (806) attaches its own certificate 816 with the certificate 815 it received from the plant E (805) when it delivers the automobile (also see discussion 1 to be described later).

A dealer G (807) receives a certificate required for verifying that it is a "Japanese plant—product level A or upper" from the product specification management authority. G (807) verifies "whether the automobile delivered from the plant F uses parts from the plant A and whether it purchases, processes, and assemblies parts from the affiliated plants of product level indicated by plant F (806)" by using the attached certificate (816) it received when the automobile is delivered and the certificate it received at step C01 (also see discussion 2 to be described later).

If parts of a delivered automobile have some problem and the plant affiliated to the plant F needs to be identified, the dealer G (807) requests the plant identification authority 820 to identify the affiliated plant and seeks the cause of the problem. As a result of seeking the cause, the plant identification authority 820 verifies a specific flow between the affiliated plants which may be suffered from a worsening problem (step B01 to B05) and prevents the problem from being enlarged.

With such a protocol, the system can certify correctness of the transaction to the dealer G (807) without letting the dealer G (807) know detailed information on the affiliated plants of the plant F (806). If a problem occur between supply chains and a third-party with authority identifies individual affiliated plants and a specific flow between the affiliated plants, the dealer can find out the cause of the problem and prevent the problem from being enlarged.

In the above-mentioned protocol, two points below will be discussed.

As a certificate is created when a group signature is performed, basically the attached certificate is digital data. As an attaching method, it is considered to manage a signature in a server which sings a digital delivery slip with a signature embedded in a part tag and allow a dealer to retrieve the signature from the server as required. As various kinds of attaching methods can be used according to the situation, the present invention is considered as highly versatile.

A dealer needs not to verify a certificate each time an automobile is delivered. Basically, the dealer can verifies according to the situation, being confident that the plant F complies with the contract. That is to say, as the plant F needs not to pass signature data each time it delivers an automobile, it can also consider a sending cost of signature data.

Figure 13:
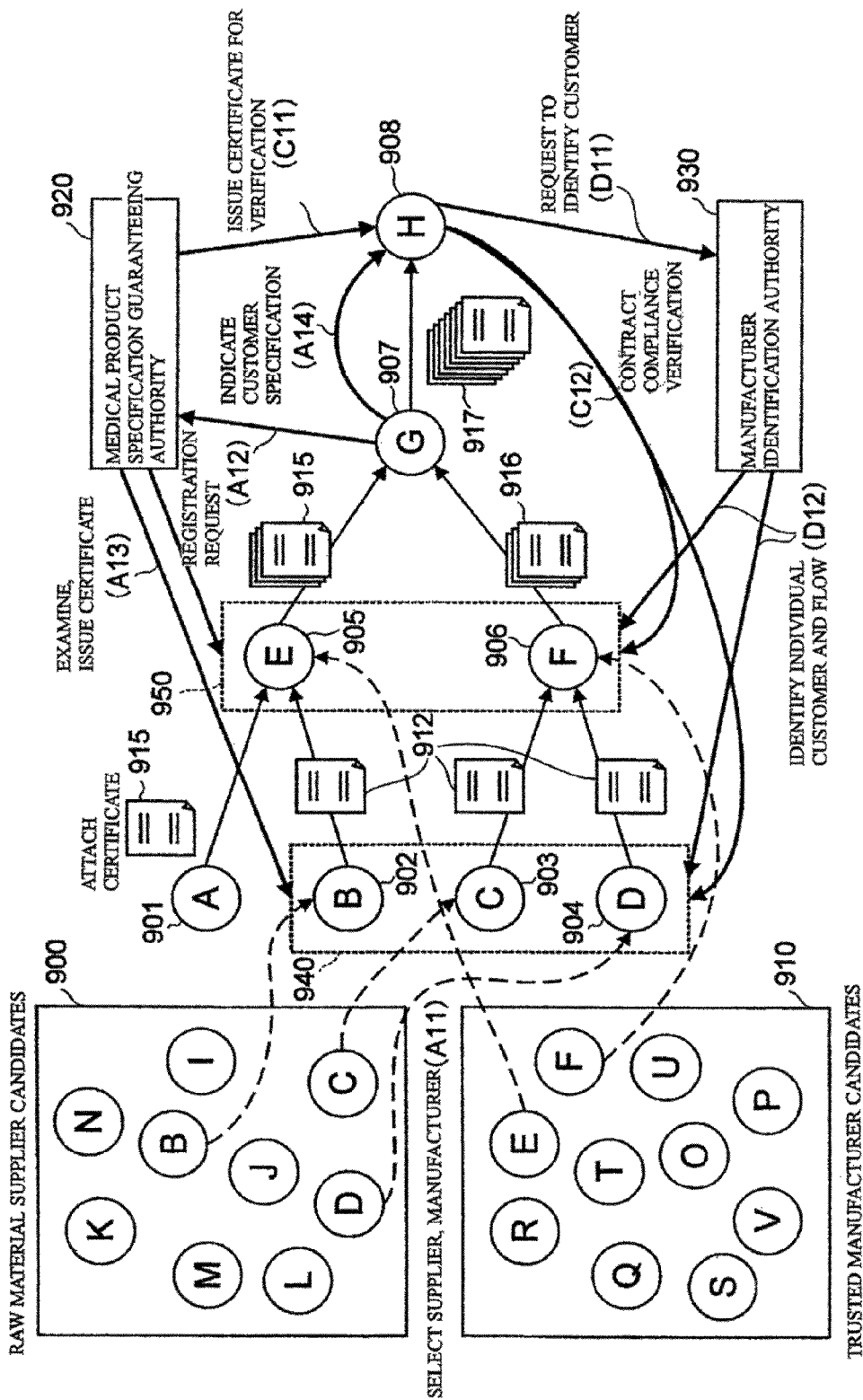
FIG. 13 is a diagram showing a specific example 2 of the embodiment.

FIG. 13 shows another specific example of applying the present invention to traceability of medical products. In this specific example, a medical product specification guaranteeing authority 920 is a certificate authority CA, a raw material supplier A (901) is a disclosed supplier S1, raw material suppliers B (902), C (903) and D (904) are private suppliers PS1, PS2 and PS3. A trusted manufacturers E (905) and F (906) are private suppliers PS4 and PS5. A medical product manufacturer G (907) is a supplier manager SM and also a disclosed supplier S2. It is assumed that a medical institution H (908) is a verifier V and a manufacturer identification authority 930 is an auditor AS. A device corresponding to that in FIG. 1 exists for each entity.

In this case, the above-mentioned suppliers and each authority are connected with each other as shown in FIG. 13. The medical product specification guaranteeing authority 920 has different specifications for raw material supplier candidates 900 and trusted manufacturers 910, with groups indicating specifications also different. The protocol will be as below.

G (907) selects candidates B, C, D and E and F which can be registered as a supplier (group M) which "deals with 1000 companies or more at a specification guarantee level AA" and a manufacturer (group P) which "deals with 500 companies or more at a specification guarantee level A" from raw material suppliers and trusted manufacturers. G (907) requests a medical product specification guaranteeing authority to examine the selected B (902), C (903), D (904) and E (905) and F (906) for being registered in groups M and P, respectively. The medical product specification guaranteeing authority 920 examines B, C and D for a specification guarantee level and a size of the transactions as raw material supplier and examines E and F for a specification guarantee level and a size of the transactions as a trusted manufacturer. If they fulfill the specifications, the authority issues certificates indicating that they are in groups M and P, respectively. When the G contracts with a medical institution, it indicates that it deals with suppliers in the group M for raw materials and with manufacturers in the group P for trusted manufactory.

The raw material supplier A (901) attaches its own certificate (911) when it delivers raw materials. B (902) attaches a group M certificate 912 issued by the medical product specification guaranteeing authority 920 when it delivers raw materials. E (905) attaches a group P certificate 915 with certificates it received from A (901) and B (902) when it delivers manufactured products. Similarly, F attaches a group P certificate 915 with the certificates it received from C and D when it delivers the manufactured products. G (907) attaches its own certificate (917) with certificates it received from E (905) and F (906) when it delivers medical products. A method for attaching may be the same as that described in the discussion 1 of the embodiment 1.

A medical institute H (908) receives a certificate required for verifying that it is in groups M and P from the medical product specification guaranteeing authority 920 (step C11). The medical institute H (908) verifies whether "a medical product delivered from G uses raw materials from A and uses product from a supplier or a trusted manufacturer which fulfills the medical product specification indicated by G" by using an attached certificate (917) it received at delivery and a certificate it received at C11. The certificates are treated in the same way as that described in the discussion 2 of the embodiment 1.

If a delivered medical product has a problem and a customer of F (906) needs to be identified, the medical institute H (908) requests the manufacturer identification authority 930 to identify the customer and seek the cause of the problem (step D12). According to the situation, the manufacturer identification authority 930 also verifies other flows which use the supplier or the trusted manufacturer causing the problem and prevents the problem from being enlarged.

With such a protocol, used raw materials or reliability of medical products can be certified to the medical institute H (908) without letting the medical institute H (908) know detailed information on raw material suppliers or trusted manufacturers the medical product manufacturer G (907) deals with. If a problem occurs between supply chains and a third-party with authority identifies raw material suppliers or trusted manufacturers or a specific flow between the suppliers or the manufacturers, the medical institute H (908) can recognize the cause of the problem and also prevent the problem from being enlarged.

As it is apparent from the specific examples 1 and 2, the present invention can be applied without regard of the shape of a flow between supply chains. The present invention can also be applied to a case where a plurality of groups are present in undisclosed supplier between supply chains. Therefore, the present invention is a much versatile method to be applied to various industries.

It should be noted that the method of the present invention may be embedded in a program product, which includes all features for implementing the method of the present invention and can implement the method when it is loaded in a machine system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A traceability system for using a certificate issued by a certificate authority device to trace a supply chain by a signature chain, the traceability system comprising at least one computer processor adapted to implement:
   a signature chain for the supply chain issued by the certificate authority device, wherein in the supply chain a deliverer receives a supply of parts for products from disclosed suppliers and undisclosed private suppliers to at a delivery destination, the deliverer ships the products comprising the parts to at least one third party, the disclosed suppliers being identified to the third party and the undisclosed private suppliers being unidentified to the third party, the signature chain comprising:
   a first signature based on a first individual certificate issued to a disclosed supplier device selected from the disclosed suppliers;
   at least one second signature based on a group certificate issued by the certificate authority device, the group certificate being common to a plurality of the undisclosed private suppliers; and
   a third signature based on a second individual certificate of a supplier manager after said signature chain is signed by the at least one second signature;
   a verifier device configured to verify said signature chain while maintaining confidentiality of said private suppliers, wherein the verifying is based on a group public key received from said certificate authority device.

2. The traceability system according to claim 1, wherein the supplier manager is configured to register said private suppliers in said certificate authority device as a group.

3. The traceability system according to claim 1, further comprising:
   wherein said verifier device is configured to verify said supplier manager by using a public key of said supplier manager device from said signature chain; and
   wherein said verifier device is configured to request said group public key of said private suppliers from said certificate authority device, to divide signatures of the supplier manager and the disclosed supplier from said signature chain, and to verify said private suppliers as a group by using said public key.

4. The traceability system according to claim 1, wherein the verifier device includes a computer processor.

5. The traceability system according to claim 1, further comprising an auditor device for identifying said private suppliers.

6. The traceability system according to claim 5, wherein the auditor device is configured to identify said private suppliers and a flow between said private suppliers from said signature chain by said auditor device using a group private key of said private suppliers in response to said verifier device requesting said auditor device to identify said private suppliers.

* * * * *